Aug. 22, 1967

I. STEIN 3,337,075

STORAGE MEDIA

Filed Dec. 26, 1962

IRVING STEIN
INVENTOR

BY Nathan N. Kallman

ATTORNEY

United States Patent Office 3,337,075
Patented Aug. 22, 1967

3,337,075
STORAGE MEDIA

Irving Stein, Palo Alto, Calif., assignor to Ampex Corporation, Redwood City, Calif., a corporation of California Filed Dec. 26, 1962, Ser. No. 247,252
4 Claims. (Cl. 117—215)

This invention relates to novel and improved storage media, and in particular to storage media employing the Hall effect.

Known recording and playback systems employ magnetic tapes for recording and storing data. Magnetic tapes are generally formed by depositing a layer of ferromagnetic material, such as gamma ferric oxide, on a non-magnetic base. Information recorded and stored on a magnetic tape may be read out by means of a magnetic transducer or head that senses the magnetic flux associated with the magnetic pattern recorded on the tape. However, such systems experience poor short wavelength response as a result of improper head-to-tape spacing. Also, the electrical characteristics and dimensions of the head are factors, inter alia, that detrimentally affect the signal response.

An object of this invention is to provide new and improved storage media that also serve as self-transducers.

Another object is to provide novel storage media that employ Hall effect material for detection of stored magnetic information.

Another object is to provide a novel readout system that may be used with Hall effect media.

In accordance with this invention, a magnetic medium or tape incorporates a Hall effect material, or a semiconducting material that exhibits the Hall effect as a storage element. Materials exhibiting such a Hall effect are well known in the art and may be found for example, in the publications, "The Hall Effect and Related Phenomena," E. H. Putley, Butterworth & Co., London 1960, pages 193–256, and "Introduction to Solid State Physics," Charles Kittel, John Wiley & Sons, Inc., New York, second edition, 1957, pages 296–298. The Hall effect material may be combined with a ferromagnetic material in a single storage layer or stratum; or a conducting ferromagnetic material exhibiting the Hall effect may be utilized separately as the only material in a storage structure; or separate layers of ferromagnetic material and Hall effect material may be positioned alternately to form a sandwich type storage structure. To read out a recorded storage medium that has been constructed in accordance with this invention, a readout system is utilized comprising means for applying a current, and means for deriving an output voltage signal.

The invention will be described in greater detail with reference to the drawing in which.

Similar reference numerals are used to designate similar parts throughout the drawing. It is understood that the representation of various parts and layers of material are not in exact proportion.

Figure 1:
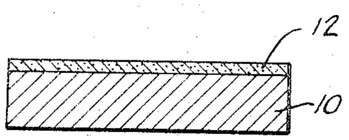
FIGURE 1 is a sectional view of one embodiment of the inventive storage medium incorporating Hall effect material and ferromagnetic material.

With reference to FIGURE 1, a storage medium in accordance with this invention comprises a nonmagnetic, nonconductive base or support 10, which may be acetate or Mylar (a trademark of DuPont), upon which a thin layer 12 consisting of a mixture formed from Hall effect material and ferromagnetic material in a nonconductive binder has been deposited. The mixture may be formed from a semiconductor material, such as indium antimonide or indium arsenide, and a magnetic material, such as gamma ferric oxide, the materials having been ball milled to provide a homogenous, intimate mixture of the two materials. The mixture comprising approximately 40–50% Hall effect material may be set in a suitable binder such as Acrilon. The thickness of the layer 12 may be about .00025 inch, whereas the base 10 may be approximately .0005 inch thick.

Figure 2:
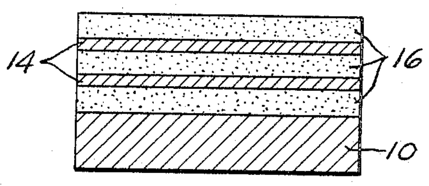
FIGURE 2 is a sectional view of an alternative embodiment utilizing a multiplicity of alternating layers of Hall effect and ferromagnetic material.

In FIGURE 2, there is shown a storage medium having alternating layers of Hall effect material 14 and ferromagnetic material 16. The Hall effect layers 14 may be formed by evaporating thin films of indium antimonide onto the ferromagnetic layers 16. The ferromagnetic layers 16 may be superimposed on the support 10 and on the underlying Hall layers 14 by spraying, brushing, doctor blade application, or other known means. The ferromagnetic layers 16 each have a thickness in the range of .02 mil. to 1 mil., whereas the Hall effect layers 14 may be of the same thickness.

Figure 3:
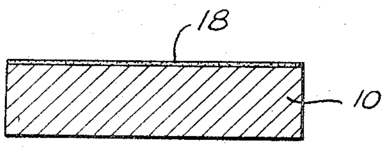
FIGURE 3 is a sectional view of another embodiment employing a conducting magnetic thin film that exhibits the Hall effect.

Another embodiment of the invention illustrated in FIGURE 3 comprises a conducting magnetic thin film 18 of a material, such as cobalt or nickel, or a combination of these, that is deposited by vapor deposition or electrodeposition on a nonmagnetic support. Such a magnetic thin film 18 is known to exhibit the Hall effect in the presence of magnetic fields. The film 18 may be about 1000–5000 angstroms in thickness.

Figure 4:
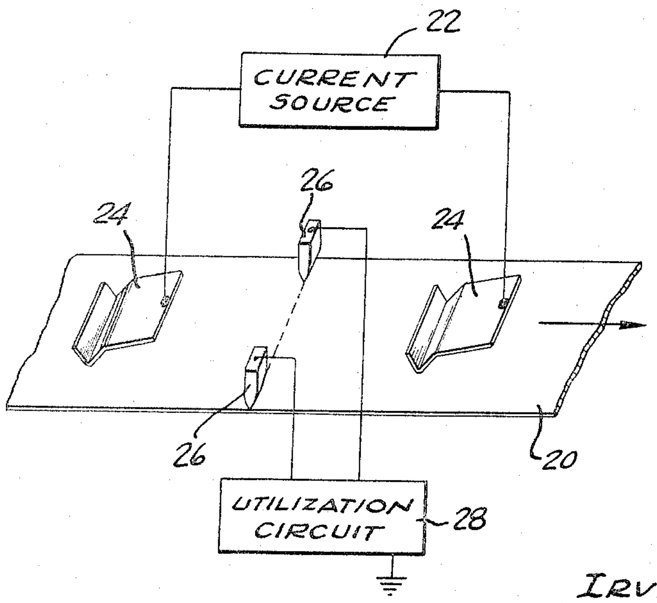
FIGURE 4 is a simplified schematic view, partly in block, of a readout system designed for operation with a storage medium of this invention.

A readout system for reading out information from a prerecorded flexible storage medium of this invention is depicted in FIGURE 4. The inventive storage medium 20 (shown broken away) is transported by conventional means from a supply reel to a takeup reel and is guided by tape guiding means and rollers, in a well known manner. The reels and tape driving and guiding apparatus are not shown for the purpose of simplicity.

A source 22 supplies current to a pair of sliding or rolling contacts 24 that ride on the tape 20 as it is transported from the supply reel to the takeup reel. Thus, a current flows along the longitudinal axis of the moving storage medium 20 between the two spaced sliding or rolling contacts 24.

In order to read out the prerecorded information that is stored by the medium 20, readout electrodes 26 are located at the opposing ends of the tape 20 to define a path that is substantially perpendicular to the path of current flow between the current contacts 24. Since the magnetic field component H is also orthogonal to the current component I and the voltage component V, the readout electrodes 26 sense an output voltage that is representative of the magnetic flux stored by the tape 20. The readout electrodes 26 provide an output signal to a utilization circuit 28 for playback or further processing of the transduced signal.

By means of the inventive storage media described herein that utilize the Hall effect, it is possible to eliminate the need for a magnetic head when playing back magnetically stored information. The use of Hall effect material adjacent to the storage material affords an intimate contact not realized by the combination of a magnetic head or transducer scanning a magnetic tape. Thus, more magnetic flux can be sensed by the Hall detector material resulting in improved sensitivity and better resolution than found with the use of a readout head. Also, the inventive structures are basically simple and inexpensive to manufacture and maintain.

What is claimed is:

1. A storage medium comprising:
a nonmagnetic and nonconductive base; and
a layer formed from a mixture of Hall effect material and ferromagnetic material disposed on such base.

2. A storage medium comprising:
a nonmagnetic and nonconductive base; and
a layer formed from a mixture of a semiconductor, from the group consisting of indium antimonide and indium arsenide, and magnetic oxide material in a binder disposed on such base.

3. A storage medium comprising:
a nonmagnetic and nonconductive base;
a plurality of layers formed from magnetic material disposed on such base; and
a plurality of layers formed from a Hall effect material interposed between such magnetic layers, all said magnetic and Hall effect layers being coextensive.

4. A storage medium comprising:
a nonmagnetic and nonconductive base;
a plurality of layers formed from gamma ferric oxide in a binder disposed on such base; and
a plurality of layers formed from a semiconductor material from the group consisting of indium antimonide and indium arsenide interleaved between such magnetic layers.

References Cited

UNITED STATES PATENTS

| | | | |
|---|---|---|---|
| 2,671,034 | 3/1954 | Steinfeld | 117—235 |
| 2,808,345 | 10/1957 | Traub | 117—235 |
| 3,150,939 | 9/1964 | Wenner | 117—235 X |
| 3,172,776 | 3/1965 | Manly | 117—235 |
| 3,238,061 | 3/1966 | Koretzky | 117—235 |

ALFRED L. LEAVITT, *Primary Examiner.*

WILLIAM L. JARVIS, *Examiner.*